United States Patent
Dalmia et al.

(10) Patent No.: US 12,292,836 B2
(45) Date of Patent: May 6, 2025

(54) CACHE SYNCHRONIZATION FOR CHIPLET ACCELERATORS

(71) Applicant: Wisconsin Alumni Research Foundation, Madison, WI (US)

(72) Inventors: Preyesh Dalmia, Madison, WI (US); Rajesh Shashi Kumar, Madison, WI (US); Matthew D. Sinclair, Middleton, WI (US)

( * ) Notice: Subject to any disclaimer, the term of this patent is extended or adjusted under 35 U.S.C. 154(b) by 1 day.

(21) Appl. No.: 18/188,209

(22) Filed: Mar. 22, 2023

(65) Prior Publication Data

US 2024/0320158 A1    Sep. 26, 2024

(51) Int. Cl.
G06F 12/0891    (2016.01)
G06F 12/0815    (2016.01)

(52) U.S. Cl.
CPC ...... *G06F 12/0891* (2013.01); *G06F 12/0815* (2013.01)

(58) Field of Classification Search
CPC .......... G06F 12/0891; G06F 12/0815
See application file for complete search history.

(56) References Cited

U.S. PATENT DOCUMENTS

2020/0409859 A1    12/2020    Saleh et al.
2023/0401130 A1*   12/2023    Mehta ............... G06F 11/0721

OTHER PUBLICATIONS

Debendra Das Sharma; "Universal chiplet interconnect express (UCIe): Building an open chiplet ecosystem." UCIE whitepaper (2022). US.

* cited by examiner

*Primary Examiner* — Nanci N Wong
(74) *Attorney, Agent, or Firm* — Boyle Fredrickson, S.C.

(57) ABSTRACT

A chiplet-based architecture provides for a reduction in cache synchronization operations by tracking a relationship between chiplet execution kernels and array operands to elide synchronization when particular arrays are not in use in the caches of other chiplets or when the current target chiplet already has the array operand. Further efficiency is promoted in some embodiments by assigning chiplets for reuse based on previously received arrays.

17 Claims, 3 Drawing Sheets

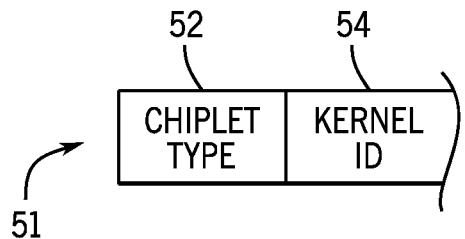
FIG. 3
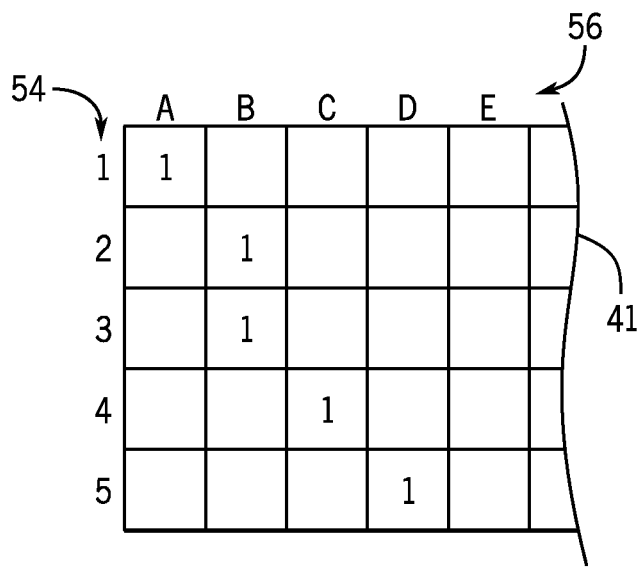
FIG. 4
| ARRAY | RANGE | R/W | C1 | C2 | C3 | C4 |
|---|---|---|---|---|---|---|
| A | 0X0–0XFFF | R | 10 | 00 | 00 | 11 |
| A | 0X3FFF–0X4FFF | R/W | 00 | 01 | 01 | 00 |
| B | 0X0–0XFFFF | R | 01 | 01 | 01 | 01 |
| C | | | | | | |
FIG. 5

CACHE SYNCHRONIZATION FOR CHIPLET ACCELERATORS

STATEMENT REGARDING FEDERALLY SPONSORED RESEARCH OR DEVELOPMENT

—

CROSS REFERENCE TO RELATED APPLICATION

—

BACKGROUND OF THE INVENTION

The present invention relates generally to computer architectures employing assemblies of "chiplet" integrated circuits and, in particular, to an improved caching system for such architectures.

As computer architectures gain complexity, reflected in the number of transistors required to implement the designs, there is interest in moving away from a single, monolithic integrated circuit substrate to designs in which the functional blocks of the architecture are separately fabricated on different substrates termed "chiplets." The chiplets are then assembled together on an "interposer" which electrically interconnects those substrates into a conventional package. The resulting integrated circuit package may be electrically connected with other components that are acceptably further removed from the interposer than the chiplets are separated from each other.

The benefits of assembling a device from chiplets include the higher fabrication yields associate with smaller area integrated circuits, the ability to change or upgrade the architecture by changing a subset of the chiplets on the interposer with reduced design and integration costs, and the potential for constructing architectures using chiplets from different manufacturers or process technologies.

This latter possibility, of using components from different manufacturers, has promoted interest in developing a uniform chiplet interface to allow these different chiplets to be readily interconnected using a common protocol and bus structure on the interposer. The proposed universal interfaces necessarily make a trade-off between universality (accommodating chiplets having a range of different functions and manufacturers) and communication speed, the latter of which tends to be reduced by the interface mechanics. This reduction in communication speed can cause a bottleneck in data flow limiting the benefits of chiplet design.

SUMMARY OF THE INVENTION

The present inventors have recognized that a significant portion of communication delay in universal chiplet interface designs comes from an additional layer of memory hierarchy necessary in the chiplet interfaces. Such caches create a bottleneck in dataflow by requiring multiple levels of cache flushing at the phase boundaries between chiplet kernel executions.

To address this problem, the present invention provides an intelligent cache monitoring system that elides cache synchronization operations that can be determined to be unnecessary when there is a sufficiently complete knowledge of the cache usage. Eliding these operations frees bandwidth in the inter-chiplet communication paths improving data flow.

More specifically, in one embodiment, the invention provides a computer architecture having a set of computational chiplets providing integrated circuitry on physically separated substrates, each computational chiplet providing a cache. An interposer provides a communication pathway between the chiplets on a substrate physically separate from the substrates of the chiplets. The computer architecture further provides a command processor for receiving commands from a host processor external to the interposer, the command indicating a given computational chiplet type, a given computational chiplet kernel providing instructions to be executed by a given computational chiplet type, and a given operand array for the given kernel. In this regard, the command processor includes a chiplet coherency table linking previously executed kernels to associated operand arrays and responds to the receipt of a command from the host processor operating to: (1) direct the kernel to a given chiplet; (2) determine whether any chiplets, other than the given chiplet, have copies of the given operand array; and (3) elide a flushing of the caches of the other chiplets when there are no copies of the given operand array.

It is thus a feature of at least one embodiment of the invention to offset the delays caused by an increase in cache levels in chiplet systems by intelligently eliding cache operations at kernel phase boundaries such as may consume interposer bandwidth.

The command processor may further elide a flushing of the caches of the chiplets when the given chiplet already has a valid copy of the given operand array in cache from a previously executed kernel.

It is thus a feature of at least one embodiment of the invention to allow intelligent reuse of cache data to further reduce unnecessary cache refresh operations.

The command processor may further assign the given kernel to a target computational chiplet when the target computational chiplet already has a valid copy of the given operand array in cache from a previously executed kernel.

It is thus a feature of at least one embodiment of the invention to steer kernels to chiplets that already have access to updated copies of the necessary array to eliminate both unnecessary flushing and reading of array data.

The chiplet coherency table may further indicate a cache state for the caches of the chiplets and further elides a flushing of the caches of the chiplets when there are copies of the given operand array in caches but they are read only.

It is thus a feature of at least one embodiment of the invention to track the read/write status of the arrays used by the chiplets to elide cache flushing when there is no danger that an array has been modified (e.g., is dirty) because it is read-only.

The chiplet coherency table may further indicate a cache state for the caches of the chiplets and further elides a flushing of the caches of the chiplets when there are copies of the given operand array in the caches but the copies are not dirty.

It is thus a feature of at least one embodiment of the invention to provide a high-resolution understanding of the cache state to eliminate cache flushing at phase boundaries for caches that are not dirty.

The chiplets may include multiple computation elements each associated with an L1 cache and communicating with an L2 cache on the computational chiplet.

It is thus a feature of at least one embodiment of the invention to improve the operation of architectures having multiple levels of cache.

The command processor may include a portion on each computational chiplet tracking and reporting the cache state of the cache and a portion on a command processor chiplet receiving the commands.

It is thus a feature of at least one embodiment of the invention to provide both a high degree of local cache information and a global perspective on cache usage for effective elision.

These particular objects and advantages may apply to only some embodiments falling within the claims and thus do not define the scope of the invention.

BRIEF DESCRIPTION OF THE DRAWINGS

FIG. 3 is a representation of a command received by the chiplet architecture of FIG. 1 from a host processor providing the chiplet type and a kernel identification;

FIG. 4 is a logical representation of an array prediction table associating a kernel of the command of FIG. 3 with an array.

FIG. 5 is a logical representation of a chiplet coherency table identifying the state of arrays currently cached by the chiplet architecture.

DETAILED DESCRIPTION OF THE PREFERRED EMBODIMENT

Figures 1, 2:
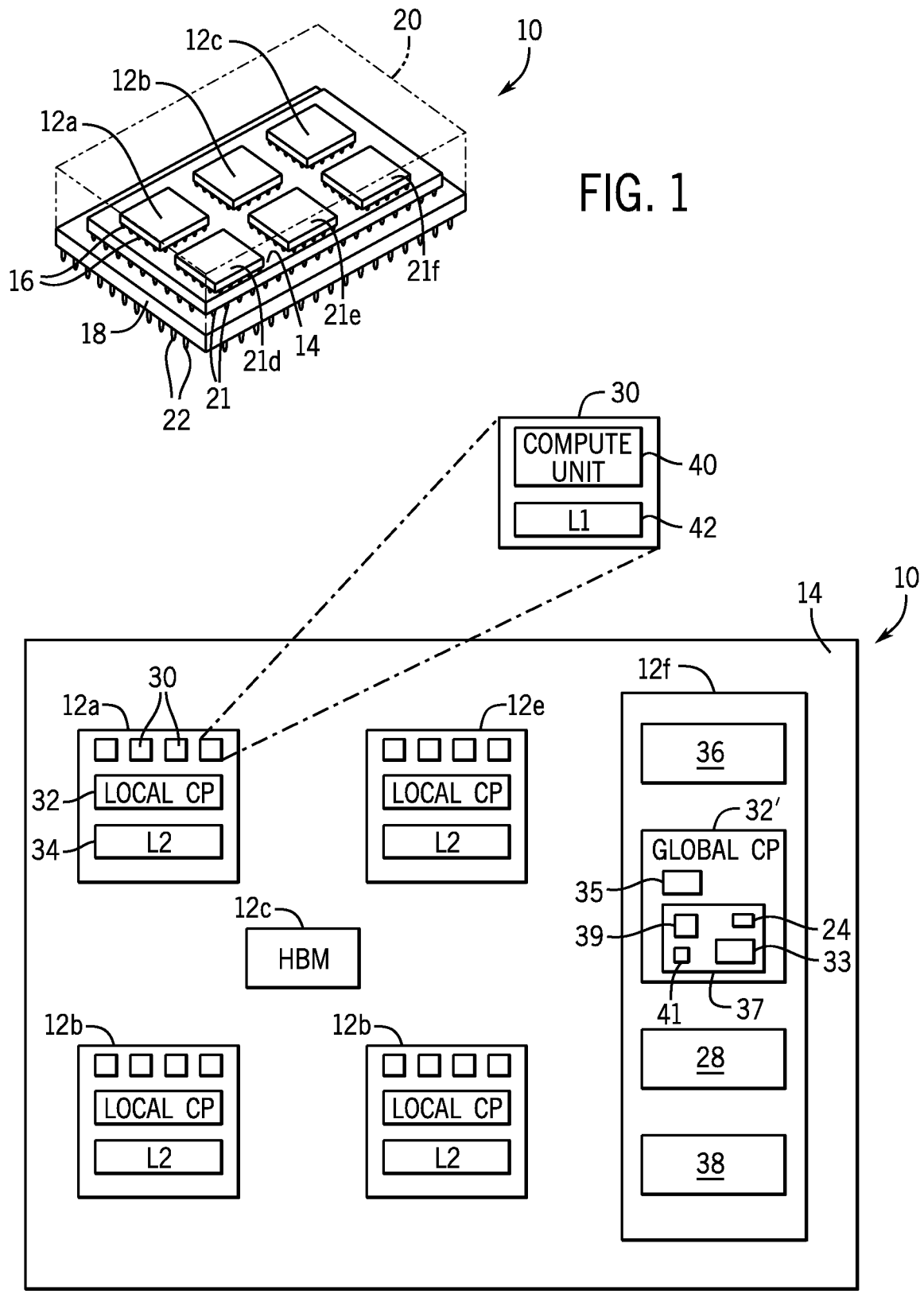
FIG. 1 is a simplified perspective view of a chiplet architecture showing multiple chiplets on an interposer attached to a carrier of an integrated circuit package.
FIG. 2 is a block diagram of the components of the chiplet system of FIG. 1 showing multiple chiplets each holding multiple computational units each having an L1 cache as collected together on the chiplet with an L2 cache and a local command processor and in communication via an interposer with each other, a memory providing an L3 cache, and a global command processor.

Referring now to FIG. 1, a chiplet integrated circuit 10 may provide for a set of chiplets 12a-12f each manufactured using standard integrated circuit techniques on a separate monolithic substrates, for example, of silicon with circuitry created through conventional techniques of doping, etching, and metallization.

The chiplets 12 may be attached to an interposer 14 providing interconnection wiring (not shown) between the chiplets 12 and, for example, constructed of a ceramic material or the like. The chiplets 12 electrically communicate with the interposer 14 by means of metallic bridges 16, for example, solder bumps, positioned between the parallel plates of the substrates of the chiplets 12 and the interposer 14.

The interposer 14 further communicates with a package substrate 18 providing together with a package housing 20 an encapsulation protecting the integrated chiplets 12 and interposer 14 from the environment. A set of metallic bridges 21 may connect the interposer to the package substrate 18, the latter of which provides for standard electrical connections 22 to attach the chiplet integrated circuit 10 to other circuitry using conventional output termination such as a pin-grid array.

In one example embodiment, each of the chiplets 12a, 12b, 12d and 12e may provide for multiple compute units 30, for example, graphic processor general processing cores.

Each of the chiplets 12a, 12b, 12d and 12e may also provide a local command processor 32 (as will be described below) and an L2 cache 34. The L2 cache 34 will not use a write-through or write-no-allocate policy but typically a write-back policy to eliminate performance degradation.

Referring still to FIG. 2, each of the individual units of the compute units 30 in a chiplet 12 may provide for a processing core 40 (for example, specializing in some accelerated computations such as graphics processing) and an L1 cache 42. The L1 caches may use a write-through or write-no-allocate cache management policy upon each change of kernel.

Chiplets 12c may provide for various other functions including, for example, a high-bandwidth memory (HBM) such as a 3-D stacked synchronous dynamic random access memory (SDRAM). The HBM chiplet 12c may implement an L3 cache.

Chiplet 12f may further include a global command processor 32' which may provide one or more processors 35 communicating with a memory 37, the latter holding reprogrammable firmware 39, an array prediction table 41, a chiplet coherency table 33, and a chiplet function table 24, all as will be discussed further below.

Generally, the local command processors 32 will communicate with the global command processor 32' to provide a fine-scale monitoring of the L2 caches in the chiplets 12 to update the chiplet coherency table 33. In addition, if a kernel uses irregular, indirect, or pointer-based accesses, the local command processors 32 can communicate the accesses to the global command processor 32'.

The global command processor 32' in turn, receives commands from the host processor and schedules work across the chiplets 12 and across particular compute units 30. By referring to the chiplet coherency table 33, the global command processor 32' has a complete picture of what data may still be in the chiplets' L2 caches and the status of that data. In addition, the global command processor 32' may perform synchronization, enforce memory consistency, copy or move memory between the host and a chiplet integrated circuit 10, perform error handling, manage the current power settings (e.g., via Dynamic Frequency and Voltage Scaling, or DVFS), and partition or virtualize the chiplet integrated circuit 10 resources.

Chiplet 12f, in this example, may also provide a direct memory controller 28, a host interface 36 for receiving commands from the host processor, and in the case where the chiplet integrated circuit 10 is a graphic accelerator, an inter-GPU interface 38 for communicating with other portions of the GPU implemented by other chiplet integrated circuits 10.

Referring momentarily to FIG. 3, during operation of the chiplet integrated circuit 10, the host processor may provide a command 51 identifying a kernel 54 to be executed by the chiplet integrated circuit 10 and the type 52 of chiplet 12 needed for that execution. This command 51 will be received by the global command processor 32' which will schedule the kernel execution with a particular chiplet 12 and will handle updating and flushing the L2 cache 34 as will now be described.

Referring to FIG. 4, for these tasks, the global command processor 32' will make use of an array prediction table 41 associating kernels with the data (arrays) they operate on, and a chiplet coherency table 33 helping to manage cache updating.

The array prediction table 41 holds a limited history of execution of previous commands 51 as monitored by the local command processors 32 which may track the data used by the kernels 54 to associate each kernel 54 (by identifier) with a particular operand array on which the kernel 54 operates. The arrays 56 may be labeled with a short label represented by a small number of bits by the host processor to conserve memory space on the chiplet integrated circuit 10. In some embodiments, the array prediction table 41 may also hold a subset of the operand array, for example expressed as a range of virtual addresses, termed herein a sub array 55, again based on this limited history.

In this regard, the array prediction table 41 may provide a set of logical rows each associated with the kernel 54 and a set of logical columns each associated with a different array 56 and optionally different sub arrays 55.

The present inventors have determined empirically that a compact array prediction table 41 can be effectively used to implement the present invention with a size compatible with a technically practical memory of the global command processor 32'. Specifically, tracking as few as five different kernels can be effective for implementation of the invention and that a number of arrays may be limited to eight in the case of the chiplet-implemented graphic processor unit. More generally, the above described rows and columns for kernels and arrays can be less than 100×100 and less than 10×10 with the data in each cell limited to 16 bits or less than eight bits. It will be appreciated that these limitations may still allow additional arrays to be effectively handled by defining the array labels coarsely to include more data. Limitations of the size of the chiplet coherency table 33 are enforced by allowing ejection of entries by flushing the caches recorded by those entries and will be described below.

Referring now to FIG. 5, the local command processors 32 and global command processor 32' may also monitor operation of the chiplets 12 to develop a chiplet coherency table 33 tracking the status of the L2 caches 34 of each chiplet 12 with respect to the particular array 56 and optionally sub array 55. The chiplet coherency table 33 provides a logical row for each array 56, and a read/write column 57 indicating whether the array 56 and particular sub array 55 has been accessed as read or read/write, and L2 status columns 59 indicating caching of the array in the L2 caches of the different chiplets 12, here labeled C1-C4 and referring to the caches of chiplets 12*a*, 12*b*, 12*d*, and 12*e*, respectively, The indicated status may, for example, be as provided below in Table I and stored in two bits of memory

TABLE I

| 00 | Not present |
|---|---|
| 01 | Valid |
| 10 | Dirty |
| 11 | Stale |

The "not present" state indicates that the array 56 is not available in the respective L2 cache while the "valid state" indicates that the array 56 is present and contains valid data that properly reflects the main memory. The dirty state indicates that the array 56 is in the cache but has been changed by the chiplet 12 so that it is not consistent with the main memory of the host processor and needs to be written back to the main memory for cache synchronization. The "stale" state indicates that the array may have been altered by another chiplet 12 but has not yet been evicted—thus if this chiplet wants to access this data again, it must invalidate it and get a new copy before accessing it again.

Referring to FIG. 2, in cases where the chiplets 12 of the chiplet integrated circuit 10 are heterogeneous (for example, having different functions in contrast to identical functions implementing an accelerator such as a GPU), the chiplets 12 and their different functions may be enrolled in the chiplet function table 24 as follows matching each chiplet to a particular function:

TABLE II

| C1 | function ID |
|---|---|
| C2 | function ID |
| C3 | function ID |
| C4 | function ID |

Figure 6:
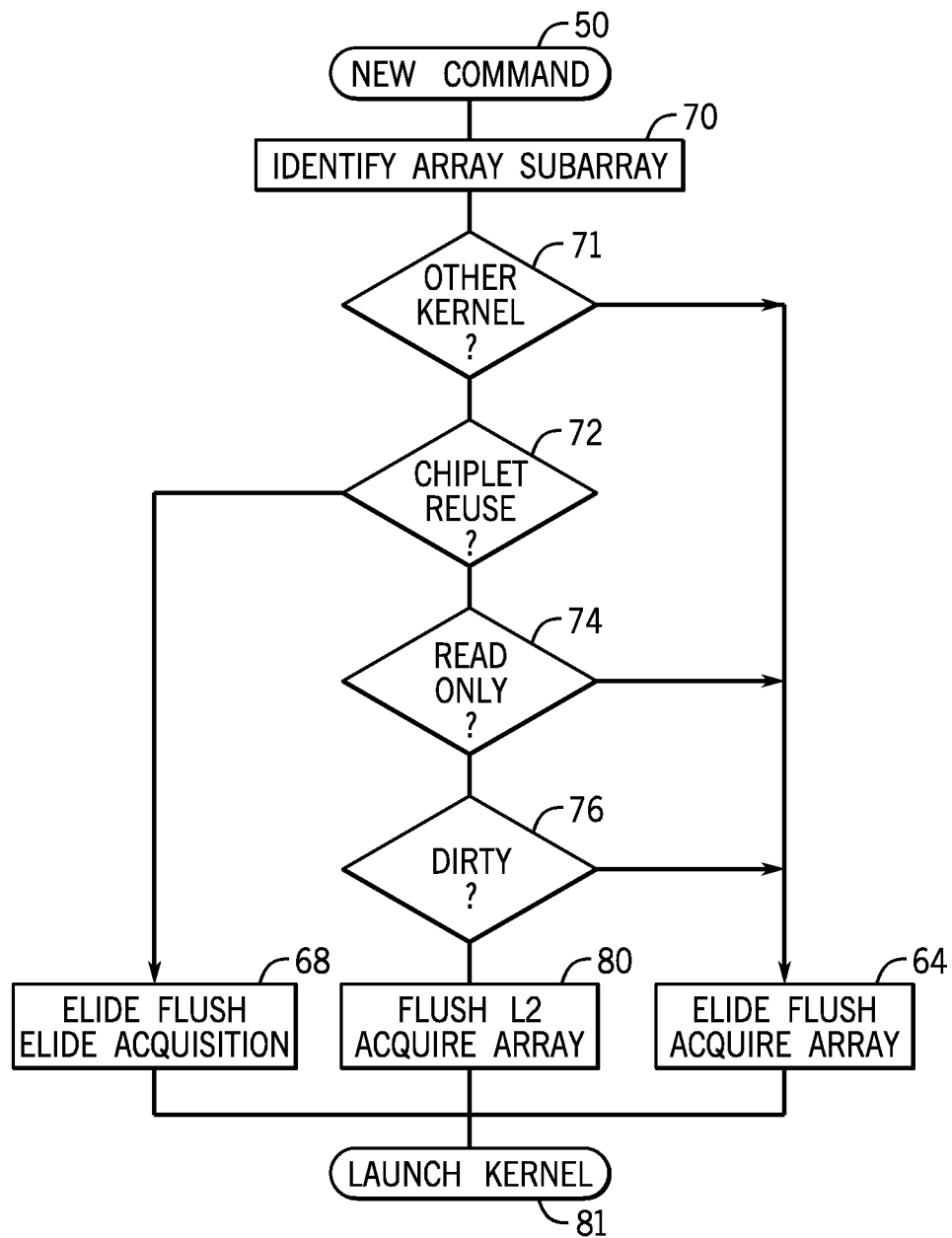
FIG. 6 is a flow chart of the steps implemented by the global command processor aided by the local command processor of FIG. 2 in implementing a cache elision according to the chiplet coherency table of FIG. 4.

Referring now to FIG. 6, the global command processor 32' executing the firmware 39, and as indicated by process block 50, may receive a new command from the host processor, for example, related to an accelerator function implemented by the chiplet integrated circuit 10. The receipt of this command indicates the occurrence of a new execution phase (a phase boundary) which would normally involve a flushing of all of the L2 caches 34 on the chiplets 12 by invalidating the cache entries and writing back any dirty cache entries (that is, entries that were modified by the chiplet 12). In the present invention, in many cases, this flushing may be skipped or elided as will be described.

At process block 70, upon receipt of the command 51, the identified kernel 54 (and optionally an identified sub range 55) is used to access the array prediction table 41 to anticipate which array 56 will be used by the kernel 54 based on historical usage patterns.

The global command processor 32' next reviews the chiplet coherency table 33 at decision block 71 to match the array 56 to L2 caches of the chiplets 12 to determine whether any chiplets 12 currently have that array 56 in their L2 caches 34. If the array 56 is not currently present in any L2 cache, indicated by the "not present" tag in each of the chiplets 12 associated with that array 56, then the flushing of the L2 caches 34 may be elided (as indicated by process block 64) and, this time instead used simply to flush and load the necessary array 56 into the L2 cache 34 of the particular chiplet 12 that will be executing the kernel 54 of the command 51 as designated by the global command processor 32'.

With an exception discussed below, this allocation of kernels 54 to chiplets 12 may be according to standard allocation procedures, for example, intended to distribute the work among chiplets 12 to manage power consumption, etc.

If at decision block 71, an existing L2 cache does contain the array 56, at decision block 72, the function of the particular chiplet 12 holding the array 56 (obtained from Table II above) is compared to the chiplet type 52 of the command 51. If there is a match, and the identified L2 cache has a cache state of "valid" or "dirty," the global command processor 32' allocates the kernel 54 to that chiplet 12 which already has a copy of the array 56, again indicating that a flushing of the L2 caches is not required per process block 68 but further that the array refresh from a memory may be elided.

In the situation where the relevant chiplet 12 indicates that the cache state is "stale" or if there is no other chiplet 12 satisfying the above conditions, the program 39 proceeds to decision block 74 to determine if the array 56 that is present in one of the chiplets 12 was designated "read only." If so, the global command processor 32 simply changes the status of the L2 cache in that chiplet 12 to "not present" in the chiplet coherency table 33 and again elides the flushing of the cache at process block 64.

If at decision block 74 the relevant array 56 was marked as read/write, then at decision block 76, the chiplet coherency table 33 is investigated to determine whether the relevant cache entry is "dirty" (as opposed to "valid" or "stale"). If the cache entry is in these latter states, then again flushing of the cache can be elided at process blocks 71. Otherwise a flushing of the identified L2 cache occurs at process block 80 and the L2 cache of the chiplet 12, to which the kernel of 54 will be allocated, is loaded with the necessary array 56. In cases where the array 56 is in one of the L2 caches outside of the chiplet 12 that will be handling execution of the command 51, only that L2 cache as may be selectively flushed. In cases where the array 56 and a given sub array 55 is in one of the L2 cache is outside of the chiplet 12 that will be handling execution of the command 51, only a portion of that L2 cache may be flushed matching the given sub array 55.

For other aspects of management of the L2 caches 34, the program 39 may employ a procedure consistent with the HMG cache protocol described in Xiaowei Ren, Daniel Lustig, Evgeny Bolotin, Aamer Jaleel, Oreste Villa, and David Nellans. HMG: Extending Cache Coherence Protocols Across Modern Hierarchical Multi-GPU Systems. In 26th IEEE International Symposium on High Performance Computer Architecture, HPCA, pages 582-595, 2020, hereby incorporated by reference. Generally the invention will enforce a sequential consistency for heterogeneous-race-free memory model (SC-for-HRF), and for this reason simultaneously executing kernels 54 will not be writing to the same array 56 without explicit synchronization.

Subsequent to process blocks 80 and 71, the array prediction table 41 and chiplet coherency table 33 may be updated and the kernel 54 described and the received command 51 may be launched per process block 81.

The term "cache" as used herein is intended to cover cache-like local memory structures distributed among the chiplets that maintain coherence across devices, meaning that valid data values in the structures having the same address are identical.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A method of operating a computer architecture having:
    a set of computational chiplets providing integrated circuitry on physically separated substrates, each computational chiplet providing a cache;
    an interposer providing a communication pathway between the chiplets on a substrate physically separate from the substrates of the chiplets;
    a global command processor for receiving commands from a host processor external to the interposer indicating: a given computational chiplet type, a given computational chiplet kernel providing instructions to be executed by a given computational chiplet type, and further receiving information identifying a given operand array for the given kernel; the global command processor including a chiplet coherency table linking previously executed kernels to associated and identified operand arrays, the method operating to:
    (1) direct the kernel to a given chiplet;
    (2) determine whether any chiplets other than the given chiplet have copies of an operand array identified to the given chiplet; and
    (3) elide a flushing of the caches of the other chiplets when there are no copies of the given operand array.

2. The method of claim 1 further eliding a flushing of the caches of the other chiplets when the given chiplet when the given chiplet already has a valid copy of the given operand array in cache from a previously executed kernel.

3. The method of claim 1 further assigning the given kernel to a target computational chiplet when the target computational chiplet already has a valid copy of the given operand array in cache from a previously executed kernel.

4. The method of claim 1 wherein the chiplet coherency table links previously executed kernels to associated operand arrays and subranges of virtual addresses within the associated operand arrays, the method further operating to:

(1) determine whether any chiplets other than the given chiplet has have copies of the given operand array and a given subrange of virtual addresses within the given operand array; and (2) when there are copies of the given operand array and the given subrange, elide a flushing of the caches of the other chiplets outside of portions of the caches of the other chiplets holding the given operand array and the given subrange.

5. The method of claim 1 wherein the chiplet coherency table further indicates a cache state for each of the caches of the chiplets and wherein the method further elides a flushing of the caches of the chiplets when there are copies of the given operand array in caches but the caches having copies of the given operand array are read only.

6. The method of claim 1 wherein the chiplet coherency table further indicates a cache state for the caches of the chiplets and wherein the method further elides a flushing of the caches of the chiplets when there are copies of the given operand array in the caches but the copies are not dirty.

7. A computer architecture comprising:
a set of computational chiplets providing integrated circuitry on physically separated substrates, each computational chiplet providing a cache;
an interposer providing a communication pathway between the chiplets on a substrate physically separate from the substrates of the chiplets;
a global command processor for receiving commands from a host processor external to the interposer indicating a given computational chiplet type, a given computational chiplet kernel providing instructions to be executed by a given computational chiplet type, and further receiving information identifying a given operand array for the given kernel; the global command processor including a chiplet coherency table linking previously executed kernels to associated and identified operand arrays, the global command processor responding to a receipt of a command from the host processor operating to:
(1) direct the kernel to a given chiplet;
(2) determine whether any chiplets other than the given chiplet have copies of a given operand array identified to the given chiplet; and
(3) elide a flushing of the caches of the other chiplets when there are no copies of the given operand array in the other chiplets.

8. The computer architecture of claim 7 wherein the global command processor further elides a flushing of the caches of the other chiplets when the given chiplet already has a valid copy of the given operand array in cache from a previously executed kernel.

9. The computer architecture of claim 7 wherein the global command processor further assigns the given kernel to a target computational chiplet when the target computational chiplet already has a valid copy of the given operand array in cache from a previously executed kernel.

10. The computer architecture of claim 7 wherein the chiplet coherency table links previously executed kernels to associated operand arrays and subranges of virtual addresses within the associated operand arrays, the global command processor responding to a receipt of a command from the host processor operating to:
(1) determine whether any chiplets other than the given chiplet have copies of the given operand array and a given subrange of virtual addresses within the given operand array; and
(2) when there are copies of the given operand array and the given subrange, elide a flushing of the caches of the other chiplets outside of portions of the caches of the other chiplets holding the given operand array and the given subrange.

11. The computer architecture of claim 7 wherein the chiplet coherency table further indicates a cache state for each of the caches of the chiplets and further elides a flushing of the caches of the chiplets when there are copies of the given operand array in caches but they the caches having copies of the given operand array are read only.

12. The computer architecture of claim 7 wherein the chiplet coherency table further indicates a cache state for the caches of the chiplets and further elides a flushing of the caches of the chiplets when there are copies of the given operand array in the caches but the copies are not dirty.

13. The computer architecture of claim 7 wherein the chiplets include multiple computation elements, each of the computation elements associated with an L1 cache and communicating with an L2 cache on the respective chiplet.

14. The computer architecture of claim 7 wherein computer architecture includes:
a portion on each computational chiplet tracking and reporting the cache state of the cache on the respective computational chiplet; and
a portion on the command processor receiving the commands.

15. The computer architecture of claim 7 wherein the chiplets are connected to the interposer by metallic bridges positioned between substrates of the chiplets and the interposer in adjacent parallel planes.

16. The computer architecture of claim 7 wherein the computer architecture further includes a high-bandwidth memory chiplet providing a stacked set of integrated circuit substrates attached to the interposer.

17. The computer architecture of claim 7 wherein the computational chiplets are graphic accelerators.

* * * * *